United States Patent [19]
Aslam et al.

[11] Patent Number: 6,082,200
[45] Date of Patent: Jul. 4, 2000

[54] ELECTRONIC DEVICE AND METHOD OF USE THEREOF

[75] Inventors: Dean M. Aslam, Okemos, Mich.; Sondes Sahli, Sacramento, Calif.

[73] Assignee: Board of Trustees operating Michigan State University, East Lansing, Mich.

[21] Appl. No.: 09/154,478

[22] Filed: Sep. 16, 1998

Related U.S. Application Data

[60] Provisional application No. 60/059,590, Sep. 19, 1997.

[51] Int. Cl.$^7$ ........................................... G01B 7/16
[52] U.S. Cl. .................................. 73/774; 73/777
[58] Field of Search .................... 73/760, 777, 763, 73/766, 774, 776

[56] References Cited

U.S. PATENT DOCUMENTS

| | | |
|---|---|---|
| 3,433,684 | 3/1969 | Zanowick et al. . |
| 3,884,080 | 5/1975 | Chapman . |
| 4,492,123 | 1/1985 | Reich . |
| 4,806,900 | 2/1989 | Fujimori et al. . |
| 4,808,009 | 2/1989 | Sittler et al. . |
| 4,826,784 | 5/1989 | Salerno et al. . |
| 4,863,529 | 9/1989 | Imai et al. . |
| 4,919,974 | 4/1990 | McCune et al. . |
| 4,925,701 | 5/1990 | Jansen et al. . |
| 5,006,203 | 4/1991 | Purdes . |
| 5,066,938 | 11/1991 | Kobashi et al. . |
| 5,075,094 | 12/1991 | Morrish et al. . |
| 5,081,438 | 1/1992 | Nakahata et al. . |
| 5,082,359 | 1/1992 | Kirkpatrick . |
| 5,082,522 | 1/1992 | Purdes et al. . |
| 5,087,434 | 2/1992 | Frenklach et al. . |
| 5,089,802 | 2/1992 | Yamazaki . |
| 5,107,317 | 4/1992 | Takasaki . |
| 5,110,577 | 5/1992 | Tamor et al. . |
| 5,114,696 | 5/1992 | Purdes . |
| 5,131,963 | 7/1992 | Ravi . |
| 5,144,380 | 9/1992 | Kimoto et al. . |
| 5,173,761 | 12/1992 | Dreifus et al. . |
| 5,183,530 | 2/1993 | Yamazaki . |
| 5,186,973 | 2/1993 | Garg et al. . |
| 5,190,823 | 3/1993 | Anthony et al. . |
| 5,204,210 | 4/1993 | Jansen et al. . |
| 5,242,711 | 9/1993 | DeNatale et al. . |
| 5,260,141 | 11/1993 | Tsai et al. . |
| 5,271,971 | 12/1993 | Herb et al. . |
| 5,290,592 | 3/1994 | Izuchi et al. . |
| 5,295,402 | 3/1994 | Bovenkerk ............................ 73/864.91 |
| 5,298,286 | 3/1994 | Yang et al. . |
| 5,298,749 | 3/1994 | Inushima . |
| 5,308,661 | 5/1994 | Feng et al. . |
| 5,309,000 | 5/1994 | Saito et al. . |
| 5,317,302 | 5/1994 | Yamazaki . |
| 5,334,342 | 8/1994 | Harker et al. . |

(List continued on next page.)

OTHER PUBLICATIONS

Taher, I., et al., Piezoresistive microsensors using p–type CVD diamond films, Sensors and Actuators A 45:35–43 (1994).

Aslam, M., et al., Piezoresistivity in vapor–deposited diamond films, Appl. Phys. Lett. 60: (23) 2923–2925 (1992).

Dorsch, O. et al., Piezoresisitive effect in boron–doped diamond thin films, Diamond 92 (ICNDST–3), Heilelberg, Germany Sep. 1992 pp. 20.2–20.3.

Sahli, S., et al., Non–uniform conduction in B–doped chemical vapor deposited diamond studied by intra–and inter–grain measurements, Appl. Phys. Lett, 70 (16) 2129–2131 (1997).

*Primary Examiner*—Max Noori
*Attorney, Agent, or Firm*—Ian C. McLeod

[57] ABSTRACT

A miniature piezoresistive sensor includes an undoped single crystal and a doped diamond film deposited by a chemical vapor deposition process on the undoped polycrystalline diamond and having a single crystal grain size of about 1 micron to 1 millimeter. The sensor preferably includes metal contacts in contact with the doped film. The resistance of the sensor varies as a function of strain on the doped diamond film transmitted through the single grain. This inexpensive highly-sensitive sensor can be used for sensing pressure, acceleration, strain or weight. It can also be used as a thermistor.

18 Claims, 14 Drawing Sheets

U.S. PATENT DOCUMENTS

| | | |
|---|---|---|
| 5,474,808 | 12/1995 | Aslam . |
| 5,488,350 | 1/1996 | Aslam et al. . |
| 5,644,089 | 7/1997 | Simpson .................................... 73/760 |
| 5,695,670 | 12/1997 | Fujii et al. . |
| 5,750,898 | 5/1998 | Kurtz et al. ............................... 73/727 |
| 5,882,532 | 3/1999 | Field et al. .................................. 216/2 |
| 5,891,575 | 4/1999 | Marchywka et al. ................... 428/408 |

TOP VIEW

CROSS SECTION

ELECTRONIC DEVICE AND METHOD OF USE THEREOF

CROSS-REFERENCE TO RELATED APPLICATION

This application is based upon Provisional Application Ser. No. 60/059,590 filed Sep. 19, 1997.

GOVERNMENT RIGHTS

None

BACKGROUND OF THE INVENTION (1) Field of the Invention

The present invention relates to miniature, highly sensitive undoped diamond single crystal and diamond thin film sensors. In particular, the diamond thin films are doped so as to be semi-conductive. The sensors are used to measure strain.

(2) Description of Related Art

Diamond piezoresistive sensors outperform their Si or SiC counterparts in sensitivity, especially in harsh environments and at high temperatures (Vaseashta, S. B. et al., Diamond—a novel sensing material, J. of Intelligent Material Systems and Structures 4 (1993) 129–135; Taher, I. et al., Piezoresistive microsensors using p-type CVD diamond films, Sensors and Actuators A 45 (1994) 35–43 and Aslam, M. et al., Piezoresistivity in vapor-deposited diamond films, Appl. Phys. Lett. 60 (23) (1992) 2923–2925). The reported piezoresistive gauge factors (GF) of single crystal and polycrystalline diamond are in the ranges of 500–3836 (most typically 2000–3836) (Taher, I. et al., Piezoresistive microsensors using p-type CVD diamond films, Sensors and Actuators A 45 (1994) 35–43) and 10–1000 (typically 10–100) (Taher, I. et al., Piezoresistive microsensors using p-type CVD diamond films, Sensors and Actuators A 45 (1994) 35–43; Aslam, M. et al., Piezoresistivity in vapor-deposited films, Appl. Phys. Lett. 60 (23) (1992) 2923–2925); Dorsch, O. et al., Piezoresistive effect in boron-doped diamond thin films, Diamond 92 (ICNDST-3), Heidelberg, Germany, September 1992, pp. 20.2–20.3; Wur, D. R. et al., Fabrication and characterization of doped polycrystalline diamond film (PDF) for strain sensing applications, in Proc. 7th Int. Conf. Solid State Sensors and Actuators (Transducers '93), Okohama, Japan Jun. 7–10, 1993, pp. 722–725 and Deguchi, M. et al., Piezoresistive property of CVD diamond films, presented at Diamond '96 (Diamond Films) jointly with ICNDST-5, Tours, France, September 8–13, Abstract No. 16.2, 1996 and Davidson, J. L. et al., Microelectronic pressure sensors with diamond piezoresistors on diamond diaphragm, Advances in New Diamond Science and Technology, 1994, pp. 693–700), respectively. As the chemical vapor deposited (CVD) polycrystalline diamond is inexpensive, it can become a commercially viable piezoresistive sensor material if its GF can rival that of single crystal diamond.

The patent art describe various sensing devices and diamond films. Included are U.S. Pat. No. 3,884,080 to Chapman; U.S. Pat. No. 4,492,123 to Reich; U.S. Pat. No. 4,806,900 to Fujimori et al; U.S. Pat. No. 5,081,438 to Nakahata et al; U.S. Pat. No. 5,089,802 to Yamazaki; U.S. Pat. No. 5,183,530 to Yamazaki; U.S. Pat. No. 5,298,749 to Inushima and U.S. Pat. No. 5,695,670 to Fujii et al. Doped diamond is a preferred material for thermistors.

Also of interest are U.S. Patent No. 3,433,684 to Zanowick et al; U.S. Pat. No. 4,808,009 to Sittler et al; U.S. Pat. No. 4,826,784 to Salerno et al; U.S. Pat. No. 4,863,529 to Imai et al; U.S. Pat. No. 4,919,974 to McCune et al; U.S. Pat. No. 4,925,701 to Jansen et al; U.S. Pat. No. 5,006,203 to Purdes; U.S. Pat. No. 5,066,938 to Kobashi et al; U.S. Pat. No. 5,075,094 to Morrish et al; U.S. Pat. No. 5,082,359 to Kirkpatrick; U.S. Pat. No. 5,082,522 to Purdes et al; U.S. Pat. No. 5,087,434 to Frenklach et al; U.S. Pat. No. 5,107,317 to Takasaki; U.S. Pat. No. 5,114,696 to Purdes; U.S. Pat. No. 5,110,577 to Tamor et al; U.S. Pat. No. 5,131,963 to Ravi; U.S. Pat. No. 5,144,380 to Kimoto et al; U.S. Pat. No. 5,173,761 to Dreifus et al; U.S. Pat. No. 5,186,973 to Garg et al; U.S. Pat. No. 5,190,823 to Anthony et al; U.S. Pat. No. 5,204,210 to Jansen et al; U.S. Pat. No. 5,242,711 to DeNatale et al; U.S. Pat. No. 5,260,141 to Tsai et al; U.S. Pat. No. 5,271,971 to Herb et al; U.S. Pat. No. 5,290,592 to Izuchi et al; U.S. Pat. No. 5,298,286 to Yang et al; U.S. Pat. No. 5,308,661 to Feng et al; U.S. Pat. No. 5,309,000 to Saito et al; U.S. Pat. No. 5,317,302 to Yamazaki; U.S. Pat. No. 5,334,342 to Harker et al; U.S. Pat. No. 5,474,808 to Aslam and U.S. Pat. No. 5,488,350 to Aslam et al.

OBJECTS

It is an object of the present invention to provide a sensor which is made from CVD doped polycrystalline diamond having the sensitivity of single crystal diamond sensors. Further, it is an object of the present invention to provide low-cost and highly-sensitive sensors which are relatively easy to fabricate.

These and other objects will become increasingly apparent by reference to the following description and the drawings.

SUMMARY OF THE INVENTION

A sensor is described which includes a doped polycrystalline diamond deposited by a chemical vapor deposition (CVD) process on a single grain and that also preferably includes metal contacts on the film made within the single grain. The single grain has a size in the range of about 1 micron to 1 millimeter.

DETAILED DESCRIPTION OF THE PREFERRED EMBODIMENT

Figure 1:
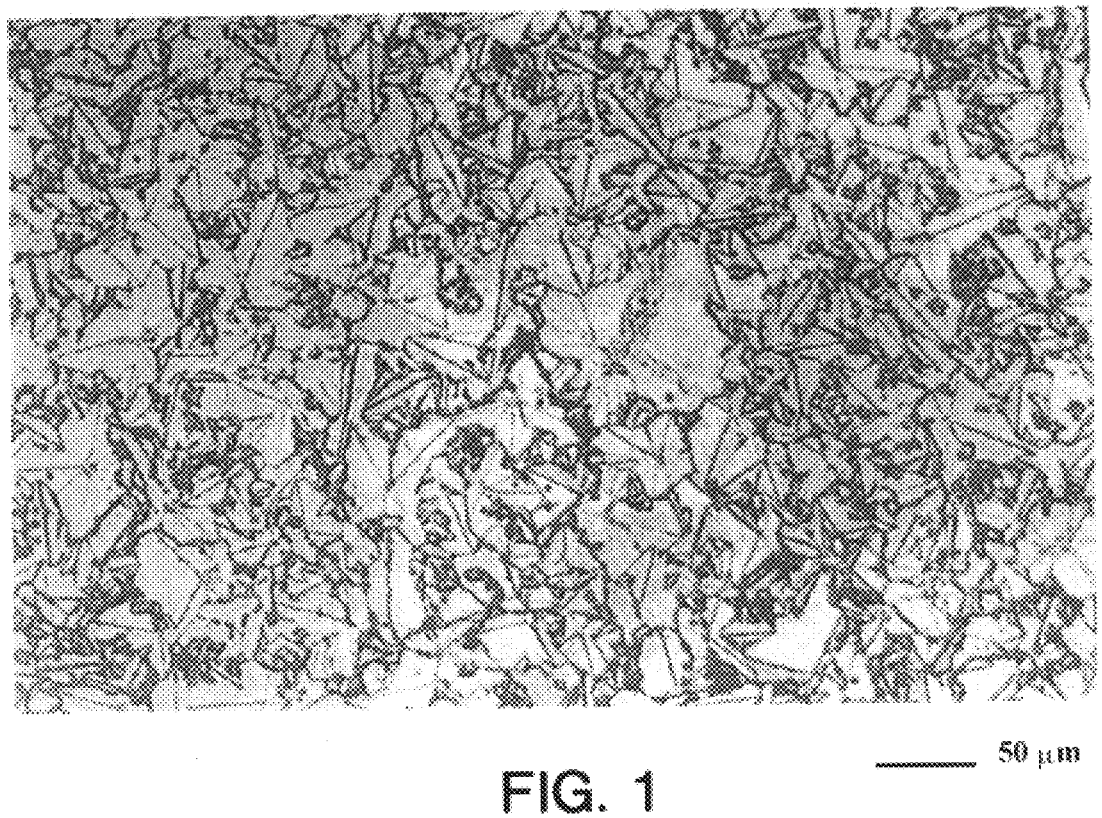
FIG. 1 is a photograph of a surface of a polished doped diamond film taken through a light microscope.

The present invention relates to an electronic device which comprises: a non-conductive diamond first single crystal (DSC) having a face; and an adherent layer of chemical vapor deposited (CVD) diamond deposited on the face as a second single crystal containing a dopant amount of at least one element which renders the second single crystal of the CVD diamond layer semi-conductive on the DSC, wherein contact means for at least two electrodes are provided on the second single crystal of the CVD diamond layer so as to provide conduction through the CVD layer adjacent to spaced apart portions adjacent to the face of the DSC and wherein electrical resistance of the single crystal CVD diamond layer on the DSC varies as a function of different forces causing strain applied to the layer.

Further, the present invention relates to a method for forming an electronic device, which comprises: providing at least one non-conductive diamond first single crystal (DSC) having a face; and depositing an adherent layer of chemical vapor deposited (CVD) diamond on the face as a second single crystal containing a dopant amount of at least one element which renders the second single crystal of the CVD diamond semi-conductive on spaced apart portions of the face of the DSC, wherein contact means for at least two electrodes are provided on the CVD diamond layer adjacent to spaced apart portions adjacent the DSC and wherein the electrical resistance of the single crystal CVD diamond layer on the DSC varies as a function of different forces causing strain applied to the layer.

Still further, the present invention relates to a method for changing electrical resistance as a function of strain, which comprises: providing a non-conductive diamond first single crystal (DSC) having a face; and an adherent layer of chemical vapor deposited (CVD) diamond deposited on the face as a second single crystal containing a dopant amount of at least one element which renders the second single crystal of the CVD diamond layer semi-conductive on the DSC, wherein contact means for at least two electrodes are provided on the second single crystal of the CVD diamond layer so as to provide conduction through the CVD layer adjacent to spaced apart portions adjacent to the face of the DSC and wherein electrical resistance of the single crystal CVD diamond layer on the DSC varies as a function of different forces causing strain applied to the layer; applying a strain to the single crystal of the CVD diamond layer of the electrical device and detecting a difference in the electrical resistance.

Further, the present invention relates to a sensor for use in high temperature and harsh environments comprising: a doped polycrystalline diamond film mounted on a selected single grain of undoped diamond; and metal contacts connected to the film within the selected single grain of the undoped diamond.

Still further, the present invention relates to an ultra high sensitivity sensor comprising undoped polycrystalline diamond (poly-diamond) film having grain sizes ranging from about 1 micron to 1 millimeter, the sensor including a resistor fabricated within a single diamond grain of the diamond film pattern using lithographic processes and with ohmic contacts to the film, the resistor comprising a p-type diamond crystal with a thickness ranging from less than about 0.1 micron to about 10 $\mu$m and that is deposited on the undoped diamond film.

Preferably, the undoped single crystal has a face which is between about 1 micron and 1 millimeter in average diameter or length. Smaller or larger dimensions can be used. Preferably, the larger is between about 0.1 micron and 10 micron thick.

As will be apparent, the CVD diamond film layer develops as a single crystal on the single crystal of the DSC diamond with the same boundaries. It is helpful to have the face of the DSC polished to form a smooth surface.

The gauge factor of p-type diamond depends on crystallographic orientation such as (100), (110), etc. In case of optically smooth p-type poly-diamond film deposited on free-standing diamond substrate, the orientation within the grain may vary. The surface orientation has not been measured within grain (which can be measured, for example, by x-ray diffraction), orientation dependence of intra-grain piezoresistive gauge factor (GF) is unknown. Just based on other results of crystalline diamond (Taher et al., Piezoresistive microsensors using p-type CVD diamond films, Sensors and Actuators A 45 (1994) 35–43), the intra-grain GF may be in the range of 3,000–6,000 depending upon the orientation (it may be pointed out that there is no proof of the value of 6,000).

Intra-grain gauge factors (GF) of micrometer sized doped diamond crystals are comparable to gauge factors of doped single crystal diamonds. The presence of grain boundaries significantly decreases the gauge factor and deteriorates linearity of gauge factor of doped polycrystalline diamond. Specifically, experiments correlating gauge factors to current path morphology have revealed that grain boundaries in diamond films have a higher resistance than single grains of about 13 to 1.

Typically, the surface of the undoped diamond is polished smooth to expose the largest grain sizes. The grain boundaries (GB) are still evident.

In the following Experiments, four point probe resistivity measurements as a function of strain were performed on a B-doped polycrystalline diamond film chemically vapor deposited on commercially available 170 $\mu$m thick undoped and polished polycrystalline diamond. The extracted gauge factor results show that: (i) intra-grain gauge factor comparable to single crystal diamond and (ii) the presence of grain-boundaries decreases the gauge factor and deteriorates linearity. Assuming that current flow follows the shortest path and that the grain boundary is insensitive to strain, correlation of gauge factor to current path morphology reveals that grain-boundary has higher resistance than the grain.

By placing metal contacts within a grain of polycrystalline diamond ("poly-diamond"), a commercially viable sensor having the sensitivity of single crystal diamond sensors is made. The placement of contacts on the diamond crystals can be done in different ways, such as by (1) randomly placing closely spaced strips of film onto a polycrystalline diamond film having a predetermined grain size that is somewhat larger than the spacing of the strips, or (2) by locating a particular diamond grain (such as by using a light microscope for large grain) or an electron microscope for very small grains and then connecting metal strips/contacts within a grain of the selected diamond grain.

EXAMPLES 1 TO 3

A. Sensor Fabrication

A Boron-doped diamond film, with thickness of 1–2 $\mu$m, was grown on commercially available undoped (170 $\mu$m thick) polished polycrystalline diamond substrate using a hot filament reactor. The growth conditions are 400 sccm hydrogen mixed with 4 sccm methane at 50 Torr with substrate and filament temperatures of 900° C. and 2,300° C., respectively. The Raman spectrum of the doped film, shown in FIG. 1B, displayed excellent diamond quality. The doped layer on top of the undoped film (see FIGS. 7A to 7D) has been shown to have improved electrical properties. The doped film was annealed for 10 minutes at 600° C. in $N_2$ in a rapid thermal processor (Plano, M. A. et al., Thickness dependence of the electrical characteristics of chemical vapor deposited diamond films, Apply. Phys. Lett. Vol. 64, pp. 2923–2925, 1994). The average film resistivity measured by four-point probes is 0.28 $\Omega$cm.

B. Film Characterization

Figure 1A:
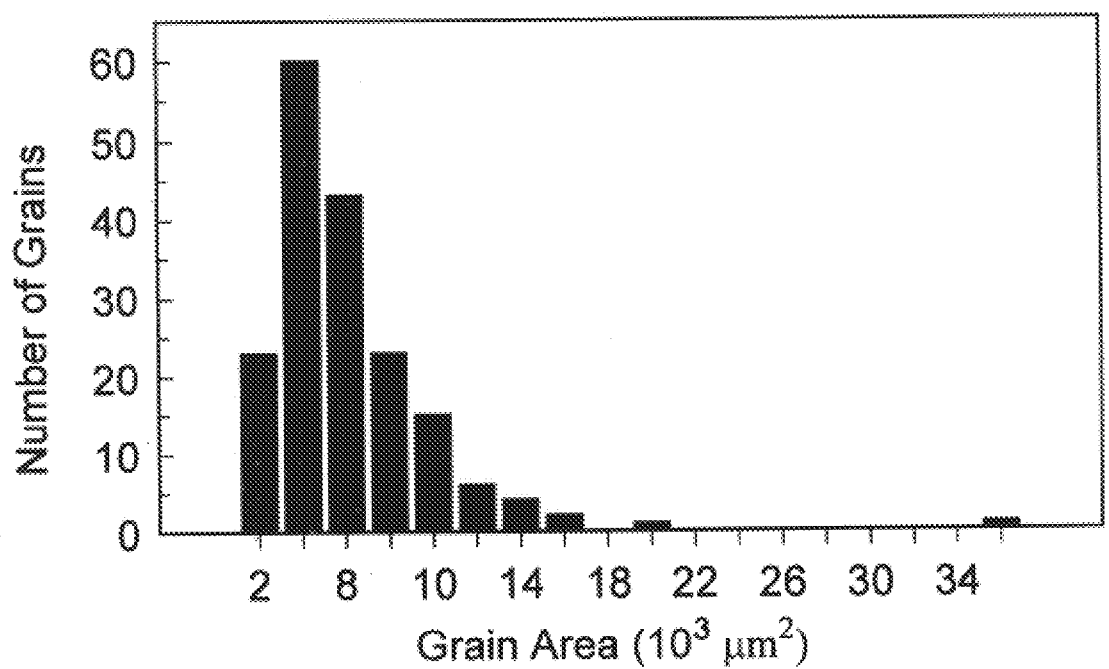
FIG. 1A is a bar chart associated with FIG. 1 showing a distribution of grains as a function of grain area.
Figure 1B:
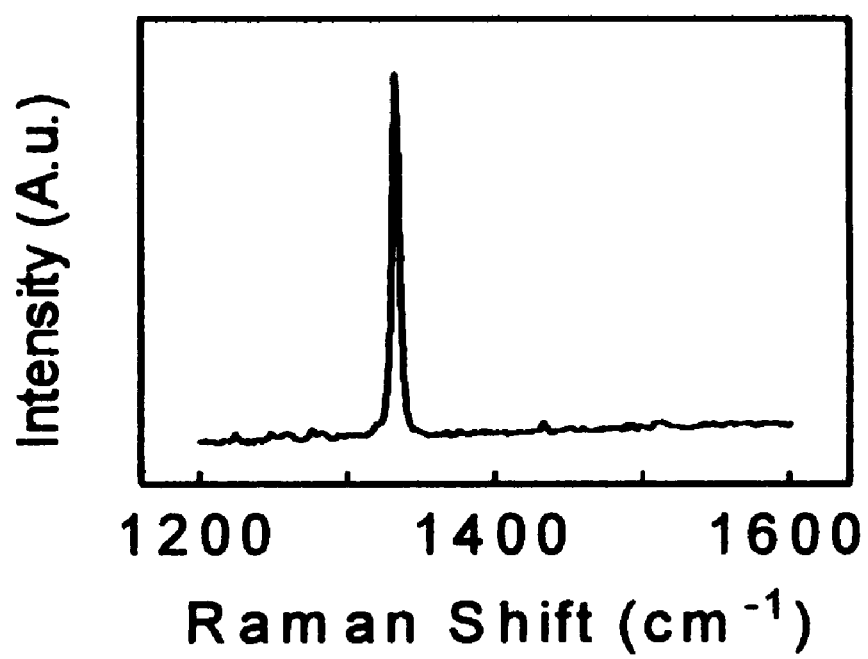
FIG. 1B is a Raman spectrum graph of the diamond of FIG. 1 showing a high diamond quality.
Figure 2:
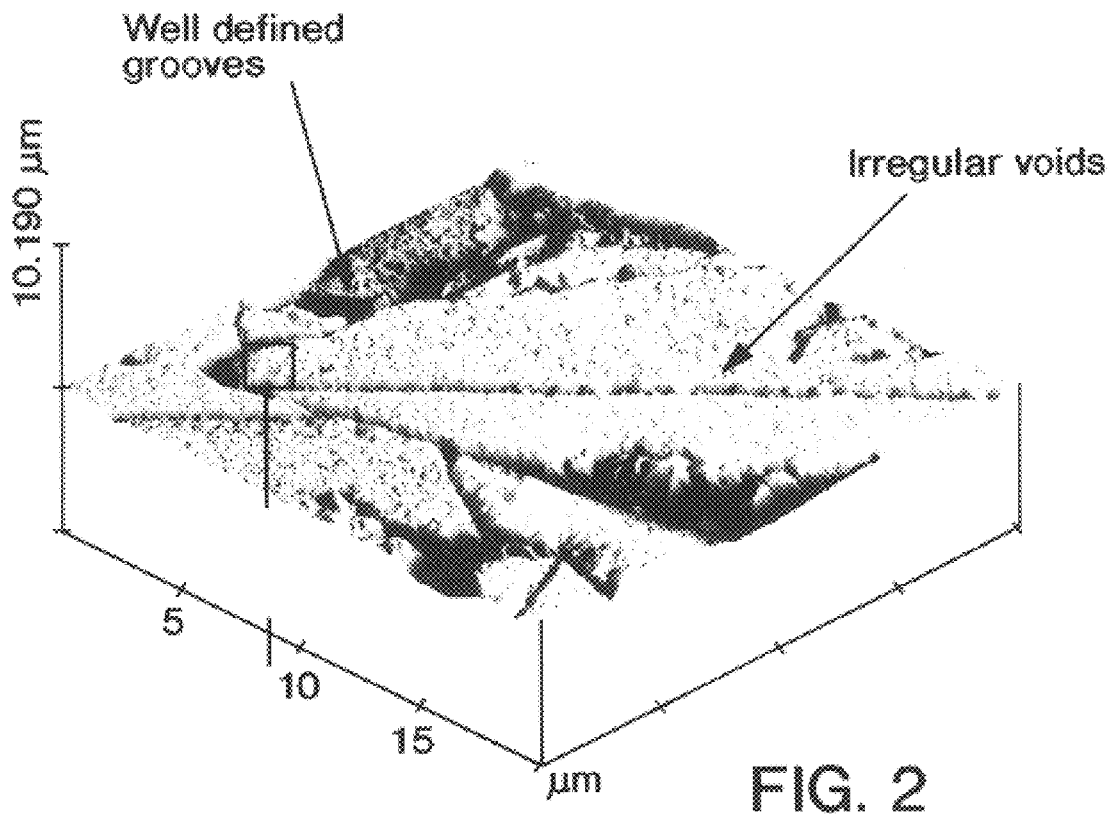
FIG. 2 is a perspective view of a portion of the surface of FIG. 1 taken by an atomic force microscopy (AFM) showing a grain boundary.
Figure 3:
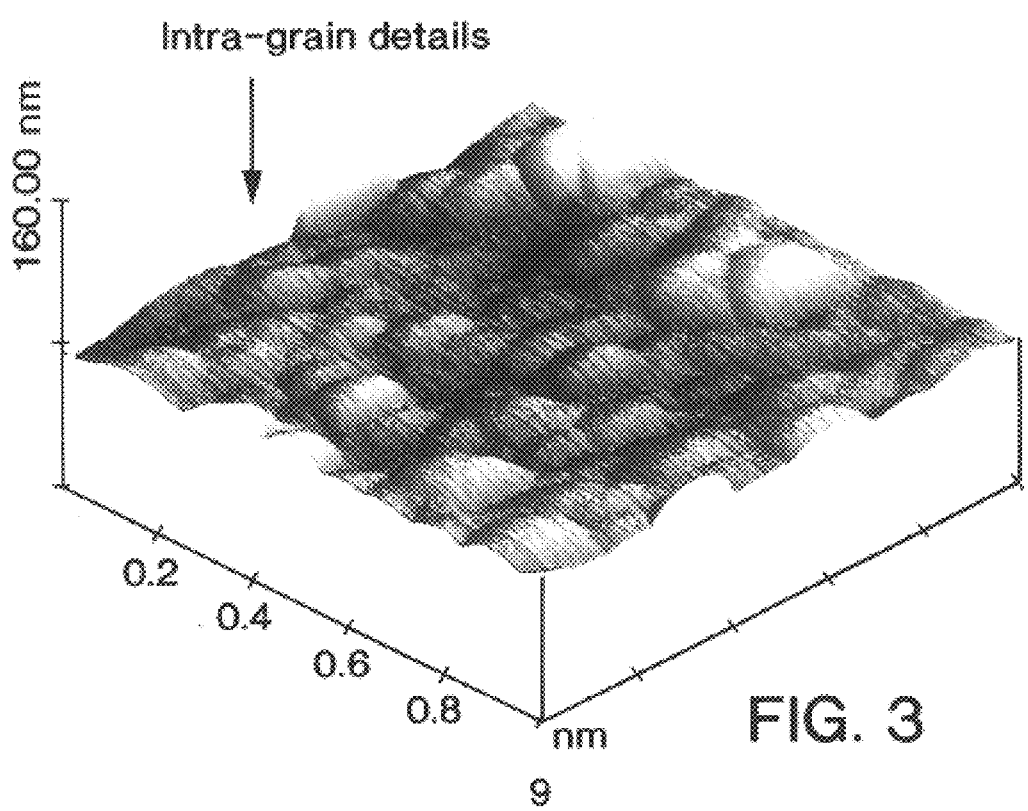
FIG. 3 is a perspective schematic view of the surface of FIG. 1 within a grain taken by AFM having a surface roughness of 5 microns.
Figure 3A:
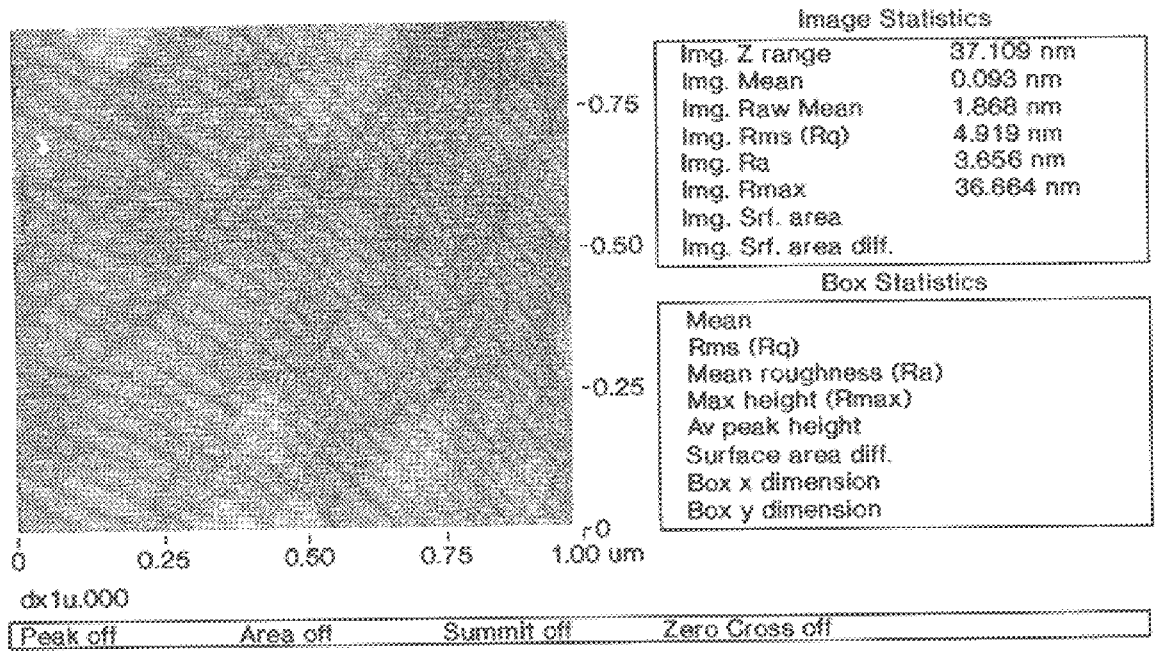
FIG. 3A is a top view of the surface of FIG. 3 taken by AFM.

Using a method of line intercepts, the grain size distribution of the doped film was determined from the light microscope (LM) photo shown in FIG. 1. The resulting histogram (FIG. 1A) indicates that the majority of grain sizes are in the range of 50 to 80 $\mu$m. The volume fraction of the grain boundaries is around 12%. Finer details of the film structure are obtained using atomic force microscopy (AFM) (FIG. 2). FIG. 2 shows that grain boundaries are not completely filled, which suggests that polishing did not completely smooth the film surface. The grain boundary depth in the doped film is in the range of 1 to 2 $\mu$m. As seen in FIGS. 3 and 3A, typical intra-grain average surface roughness is less than 5 $\mu$m.

C. Measurement Setup

Figure 4:
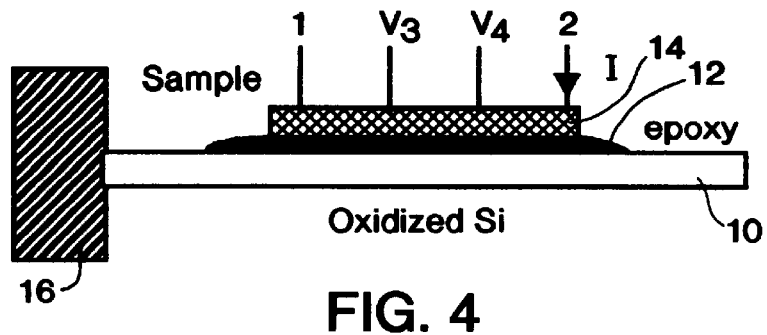
FIG. 4 is a schematic view of a cantilever beam 10 utilizing the sensor 14 of the present invention.

As shown in FIG. 4, the sample (3×3 mm$^2$) is mounted on a beam of oxidized silicon 10 using Omega's C—C cement epoxy 12. Strain is applied using a cantilever beam 10 configuration. The cantilever beam 10 set up is placed on top of the chuck 16 of a microprobe station. Four tungsten probes 18, 20, 22 and 24 connected to an HP4145B semiconductor parameter analyzer (not shown) are used to measure I–V as a function of stress. The outer probes 18 and 20 are used to apply current and the inner probes 22 and 24 are used to measure voltage, eliminating the effect of contact resistance. A video camera and VCR (not shown) are used to record the microscopic photo of the actual probe location in FIGS. 4C, 5C and 6C. D. Gauge Factor Calculation:

The probes 18, 20, 22 and 24 are placed so that the shortest current path is in the direction of longitudinal strain. The longitudinal GF is defined by:

$$GF_1 = \frac{R - R_0}{R_0} \cdot \frac{1}{\varepsilon_l}$$

where $R_0$ and R are the resistances at strains zero and El, respectively. The resistance at a given strain is determined as the slope of the least square linear fit to the measured I–V data at that strain. The average longitudinal strain is measured by mounting a commercially available wire strain gauge with a GF of 2.105±0.5% on top of the diamond film (not shown) GF is determined as the slope of the least square linear fit to the $$\frac{\Delta R}{R_0}$$

vs. strain curve.

II. Results and Discussion

A. Gauge Factor Measurements

Figure 4A:
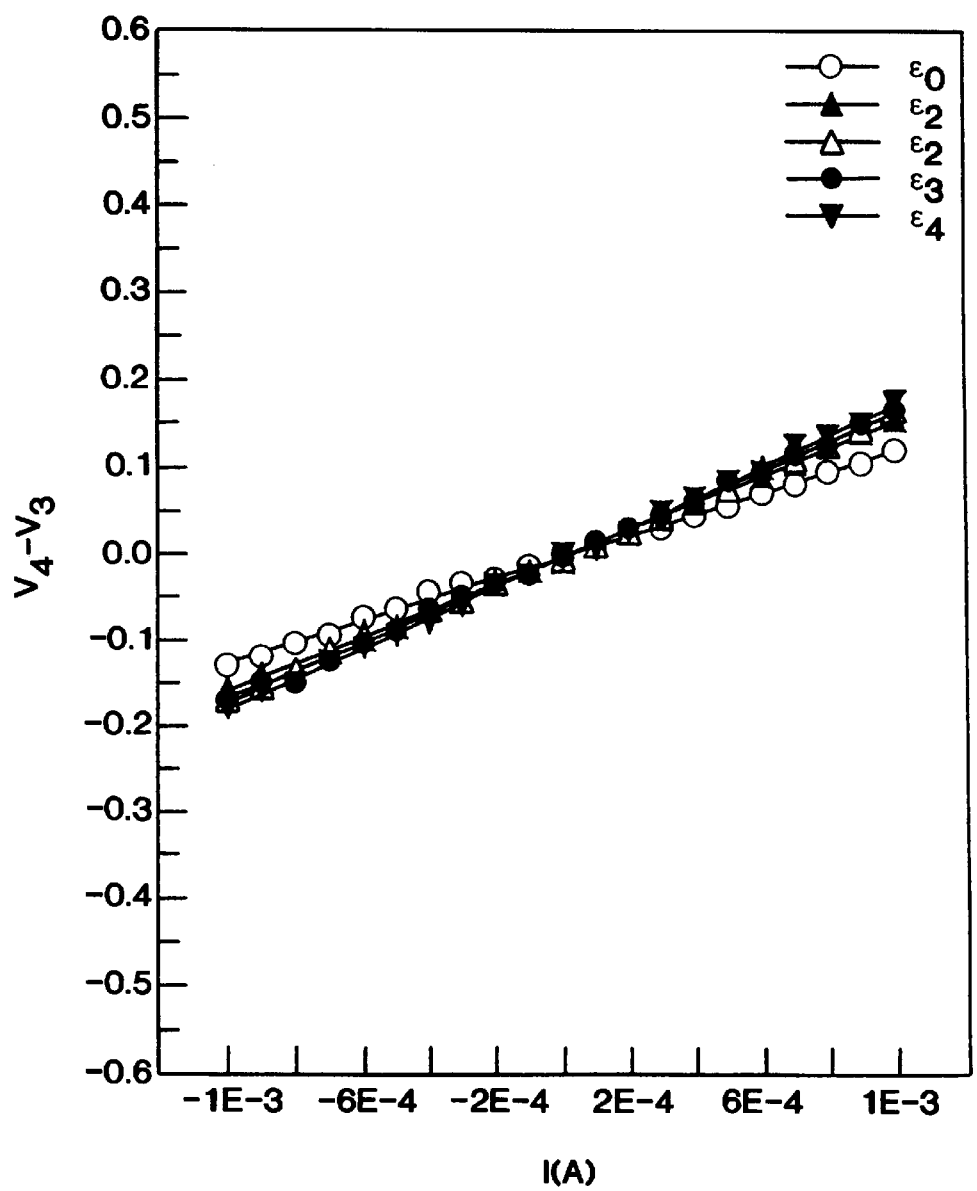
FIG. 4A is a plot showing voltage change versus strain over a multi-small-grain path for a given electrical current.
Figure 4B:
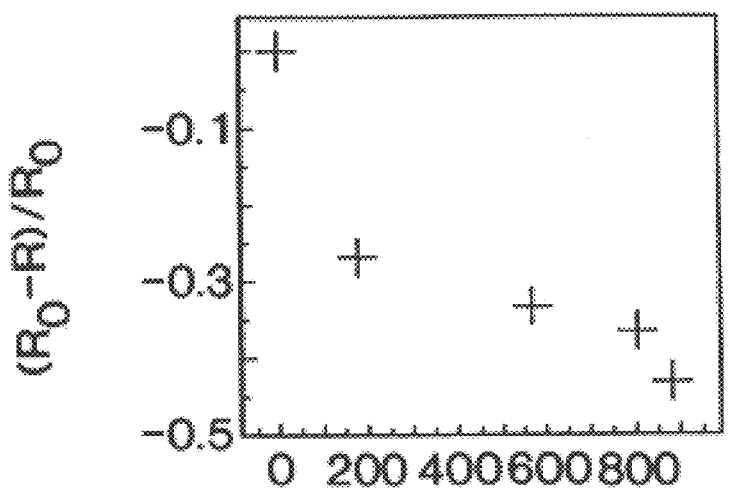
FIG. 4B is a chart showing a non-linear percentage resistance change versus strain, deduced from FIG. 4A, the slope of which results in a gauge factor of about 160 (range 100 to 300).
Figure 4C:
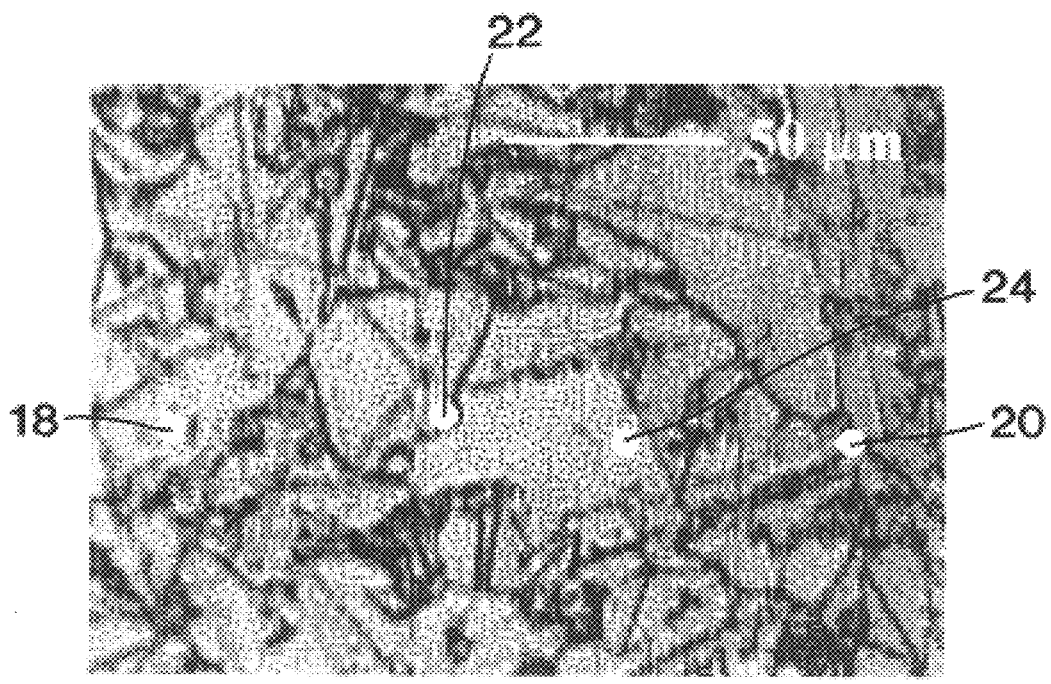
FIG. 4C is a photomicrograph plan view of probes 18, 20, 22 and 24 for voltage and current.
Figure 5A:
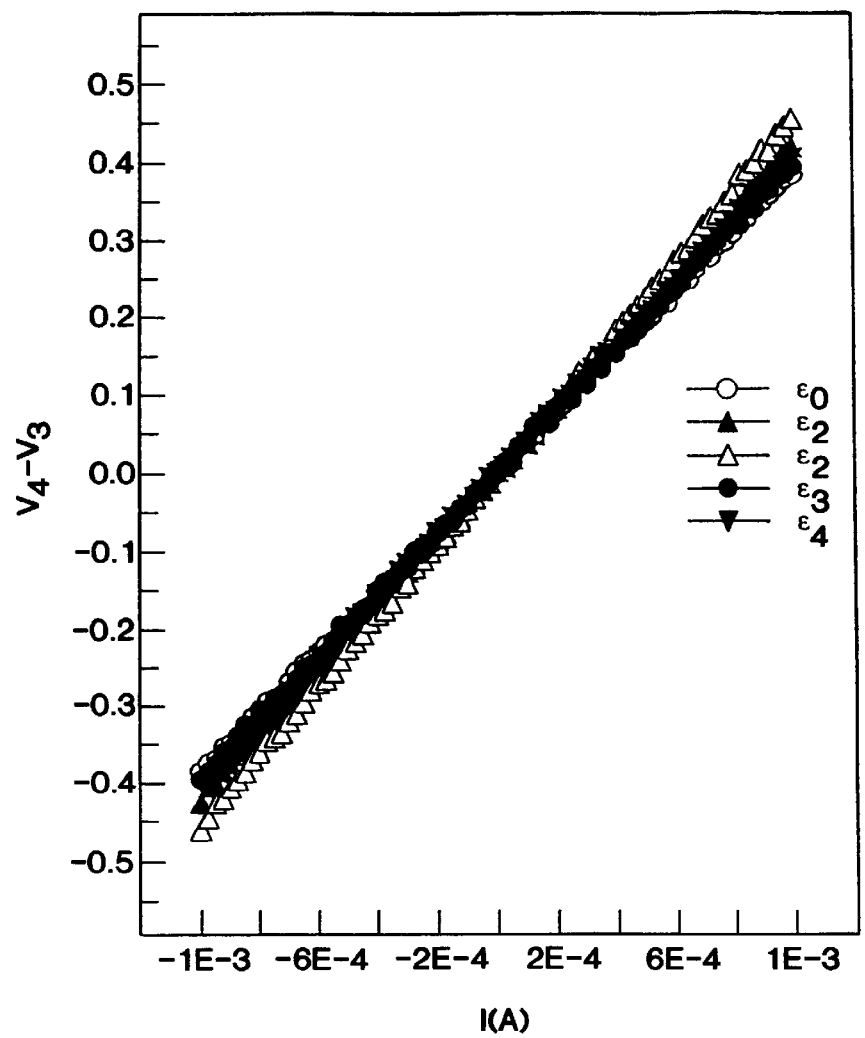
FIG. 5A is a plot showing voltage change versus strain over a grain path with a single grain boundary.
Figure 5B:
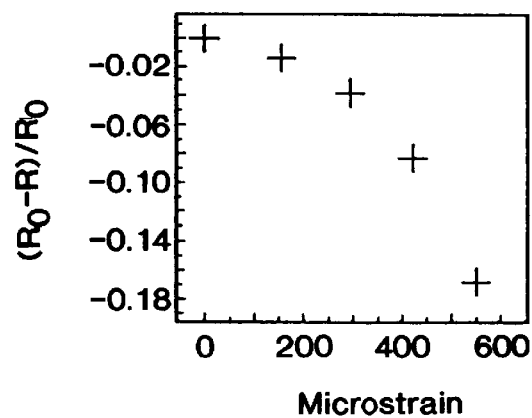
FIG. 5B is a chart showing a non-linear percentage resistance change versus strain which slope results in a gauge factor of about 360.
Figure 5C:
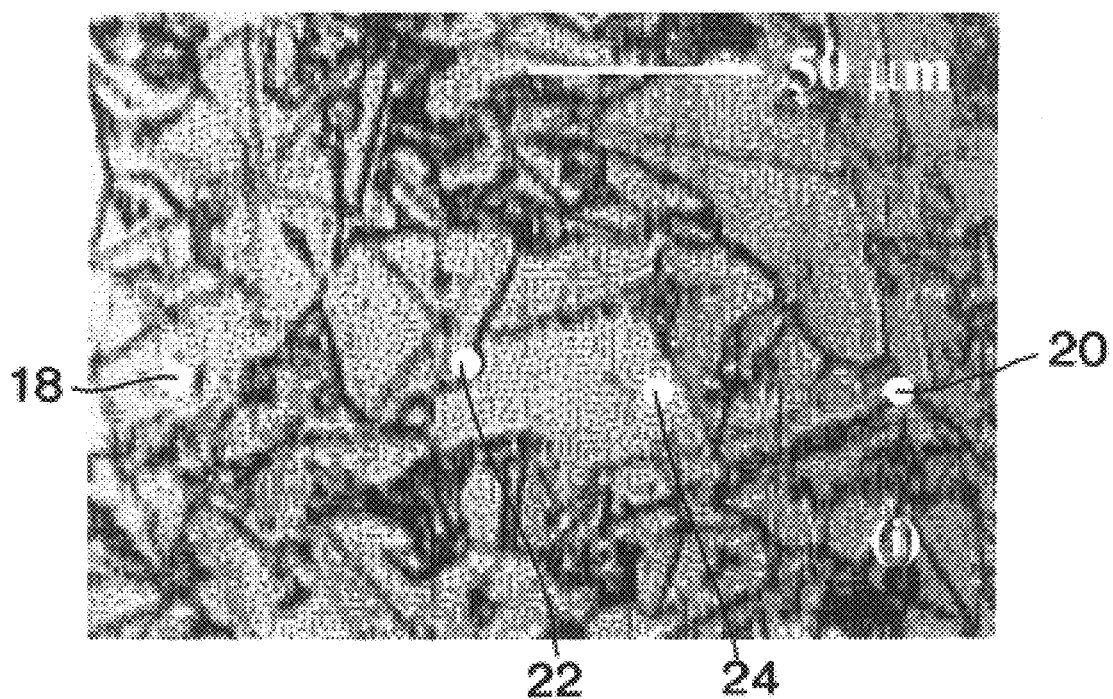
FIG. 5C is a photomicrograph plan view of probes 18, 20, 22 and 24 for voltage and current.
Figure 6A:
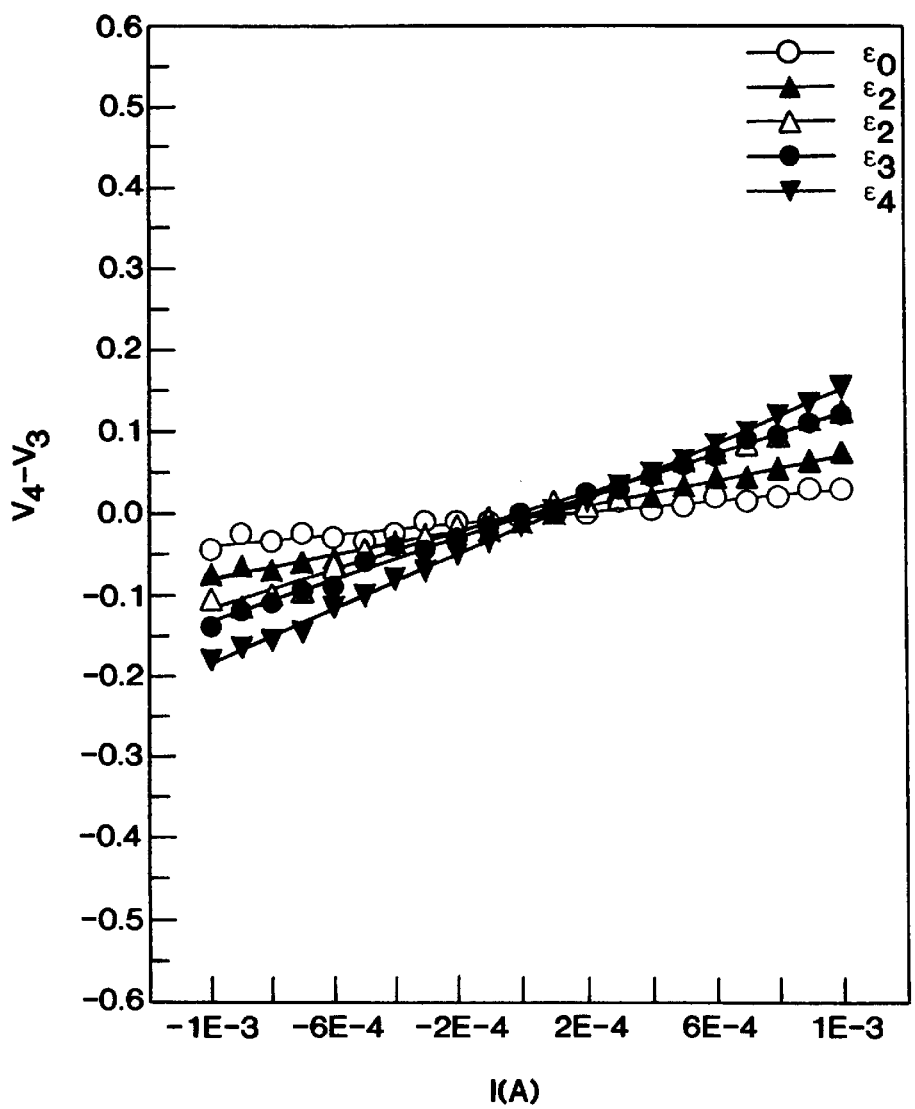
FIG. 6A is a plot showing voltage change versus strain over a single grain with no grain boundaries.
Figure 6B:
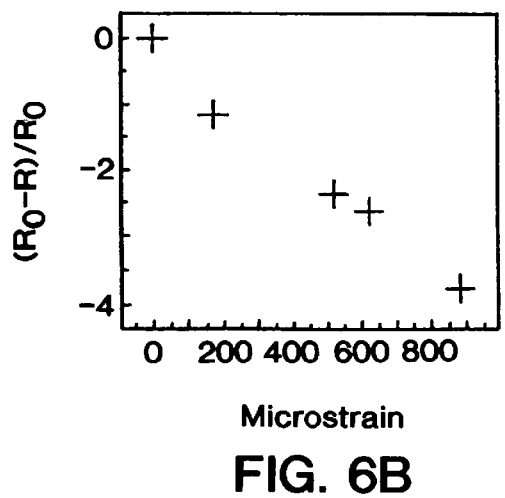
FIG. 6B is a chart showing a linear percentage resistance change versus strain which slope results in a gauge factor of about 4,500 (range 3,000 to 4,500).

I–V data measured at different regions of the sample are plotted in FIGS. 4A, 5A and 6A. The probes 18, 20, 22 and 24 locations are indicated by the white dots on the microscope photos shown in FIGS. 4C, 5C and 6C. The extracted $$\frac{\Delta R}{R_0}$$

vs. strain curve and resulting GF are also shown in FIGS. 4B, 5B and 6B.

Figure 6C:
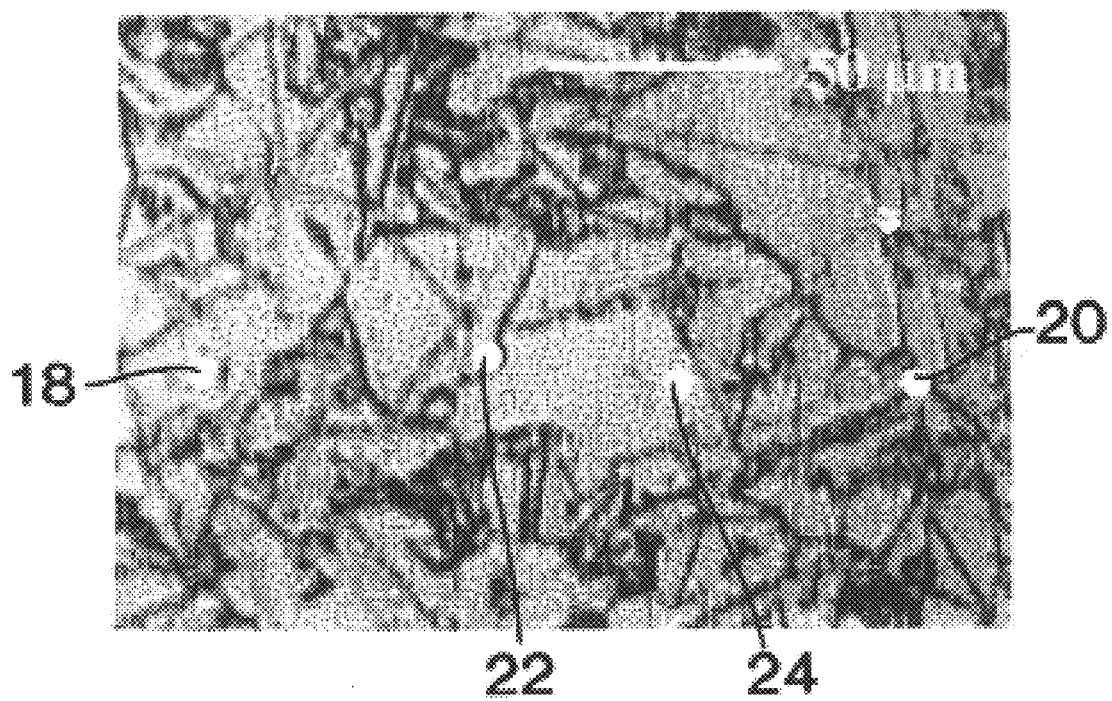
FIG. 6C is a photomicrograph plan view of probes 18, 20, 22 and 24 for voltage and current.
Figure 7A:
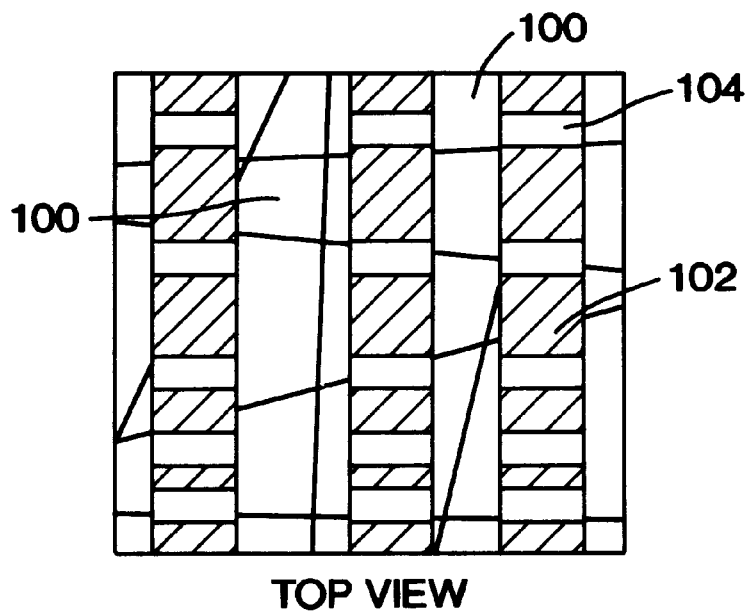
FIGS. 7A to 7D are schematic views showing a fabrication process to make two-terminal CVD diamond piezoresistors.
Figure 7B:
Figure 7C:
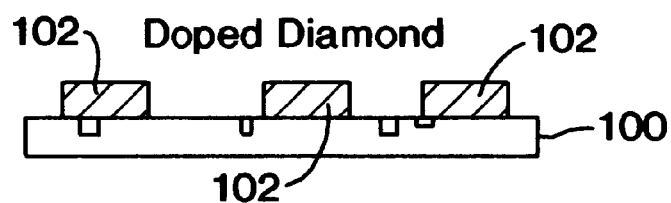
Figure 7D:
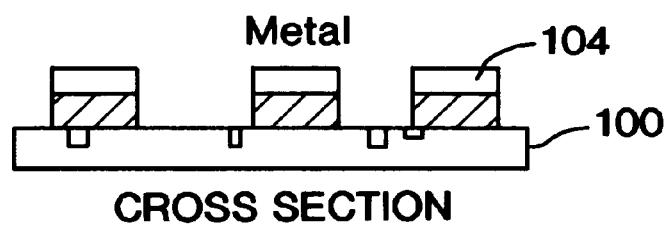

FIG. 4 shows the piezoresistive response when the shortest path between the voltage probes crosses many small grains. The resulting $$\frac{\Delta R}{R_0}$$

vs. strain curve is nonlinear and GF changes with strain reaching 3375, 160 and 750 in the strain ranges of 0–200, 200–800 and 800–881 $\mu\varepsilon$, respectively. The data shown in FIG. 5 is obtained when the voltage probes are placed within two large grain separated by a single GB. Linearity improves and GF obtained from end-point straight line fit is 360. To investigate the effect of GB on GF, the probes 18, 20, 22 and 24 are connected such that their shortest path does not cross any GB, as shown in FIG. 6C. The strain curve is linear and the extracted GF is 4687 as shown in FIGS. 6A and 6B.

B. Effect of grain boundary on gauge factor:

Assuming that the dominant current path is the shortest path between the current probes for all strains, the I–V data in FIG. 6A, where the voltage probes are placed within a single grain, describe intra-grain current flow. The dominant current path depends on surface orientation of the doped diamond. Consequently, the relatively high GF of 4687 corresponds to GF inside a grain. This is consistent with the high GF range of 500–3500 reported for single crystal homoepitaxial and synthetic diamond (Taher, I. et al., Piezoresistive microsensors using p-type CVD diamond films, Sensors and Actuators A 45 (1994) 35–43). Even though it is not clear whether the boundary crossing the shortest path in FIG. 5C is a GB or a twin-boundary, its presence seems to result in lower GF and poorer linearity as shown in FIGS. 5A and 5B. This is consistent with the observation that the increase in the number of GBs that cross the shortest current path leads to changing GF with strain.

The resistance of the shortest path between the voltage probes can be written in terms of contribution of grains, $R_g$ and GBs, $R_b$:

$$R = R_b + R_g \qquad (1)$$

Using this formula the relative change of path resistance with strain can be written as:

$$\frac{R-R_0}{R_0} \approx \left(\frac{1}{1+\alpha}\right)\frac{R_g - R_{g0}}{R_{g0}} + \left(\frac{\alpha}{1+\alpha}\right)\frac{R_b - R_{b0}}{R_{b0}} \quad \text{where } \alpha = \frac{R_{b0}}{R_{g0}}. \tag{2}$$

Similarly, starting from path length:

$$L = L_b + L_g, \tag{3}$$

where $L_g$ and $L_b$ are the part of the path in grains and GBs, respectively, the relative change of path length is given by:

$$\varepsilon = \frac{L - L_0}{L_0} = \left(\frac{1}{1+\beta}\right)\frac{L_g - L_{g0}}{L_{g0}} + \left(\frac{\beta}{1+\beta}\right)\frac{L_b - L_{b0}}{L_{b0}} \quad \text{where } \beta = \frac{L_{b0}}{L_{g0}}. \tag{4}$$

Since $L_g >>> L_b$, $\beta \approx 0$ and equation (3) becomes:

$$\varepsilon \approx \frac{L_g - L_g0}{L_{g0}} = \varepsilon_g, \tag{5}$$

where $\varepsilon_g$ is the intra-grain strain. Based on equations (2)–(5):

$$GF \approx \frac{R - R_0}{R_0} \frac{1}{\varepsilon_g} = \left(\frac{1}{1+\alpha}\right)GF_g + \left(\frac{\alpha}{1+\alpha}\right)\delta GF_b, \quad \text{where } \delta = \frac{\varepsilon_b}{\varepsilon_g}, \tag{6}$$

Assuming that $GF_b \approx 0$, equation (5) gives:

$$GF \approx \left(\frac{1}{1+\alpha}\right)GF_g \tag{7}$$

Plugging in $GF_g = 4687$ and $GF = 360, 160$ yields:

$$\alpha = \frac{R_{b0}}{R_{g0}} \approx \frac{GF_g - GF}{GF} = 12, 28$$

for the data in FIGS. 4A and 4B and 5A and 5B, respectively. This is consistent with the exception that GB contribution to path resistance increases as the number of GBs crossed increases. This also suggests that the resistance of GB is higher than that of the grain. The void GB structure observed from AFM could be the reason for the high GB resistance.

EXAMPLE 4

Although the four point probe measurements allowed for measuring intra- and inter-grain GF, they are subject to the assumption that the main current path is equal to the shortest path which makes them impractical. FIGS. 7A to 7D show a fabrication process to make two-terminal CVD diamond piezoresistors. On top, a large grain undoped diamond substrate 100 and doped diamond 102 is deposited selectively using silicon dioxide or a high temperature metal as a mask (not shown) which is removed. Metal 104 is selectively deposited on the doped diamond 102. Based on the previous measurements, the piezoresistors with metal contacts within a grain of p-type diamond have a GF comparable to that of single crystalline diamond as determined by testing.

The Examples 1 to 4 demonstrate that both grains and GBs contribute to GF of B-doped CVD diamond. Intra-grain GF is comparable to that of single crystal diamond. Assuming that the shortest path is the least resistance path and writing its resistance as the sum of contribution from grains and GBs, GF is derived in terms of grain and GB gauge factors. Assuming that GB is insensitive to strain the ratio of GB to grain resistivity computed for two different paths is approximately 13.

EXAMPLE 5

A. Sensor Fabrication

As in Examples 1 to 3, a Boron-doped diamond film, with a thickness in that range of 1–2 μm, was grown on commercially available undoped polished polycrystalline diamond substrate with a thickness of 170 μm. The film was deposited in a hot filament CVD reactor at 900° C. and 50 Torr, using 1% $CH_4$ in $H_2$. The sample was annealed for 10 minutes at 600° C. in $N_2$ in a rapid thermal processor.

B. Film Characterization

The Raman spectrum shows excellent quality. Using the method of line intercepts (Exner, H. E. et al., Quantitative Image Analysis of Microstructures, DGM Informationsgesellchaft, 1988), the average grain size of the doped film is found to be 75 μm (Sahli, S. et al., Non-uniform conduction in B-doped chemical vapor deposited diamond studied by intra- and inter-grain measurements, Appl. Phys. Lett. 70 (16) (1997) 2129–2131). Atomic force microscope (AFM) micrographs shown in FIG. 8B, display well defined grooves and irregular voids ranging in width between 0.5 and 1 μm and 1.6 and 7 μm, respectively. The depth of inter-grain regions obtained from cross-sectional analysis are in the range of 0.2–0.5 μm. A typical intra-grain morphology shows an average surface roughness of 5 nm.

A 3×3 $mm^2$ sample is mounted on a beam of oxidized silicon using Omega's C—C cement epoxy, as shown in FIG. 4. The probes 19, 20, 22 and 24 are placed so that the shortest current path is in the direction of longitudinal strain, $\varepsilon_1$ as in FIG. 4.

Results and Discussions

Figure 8A:
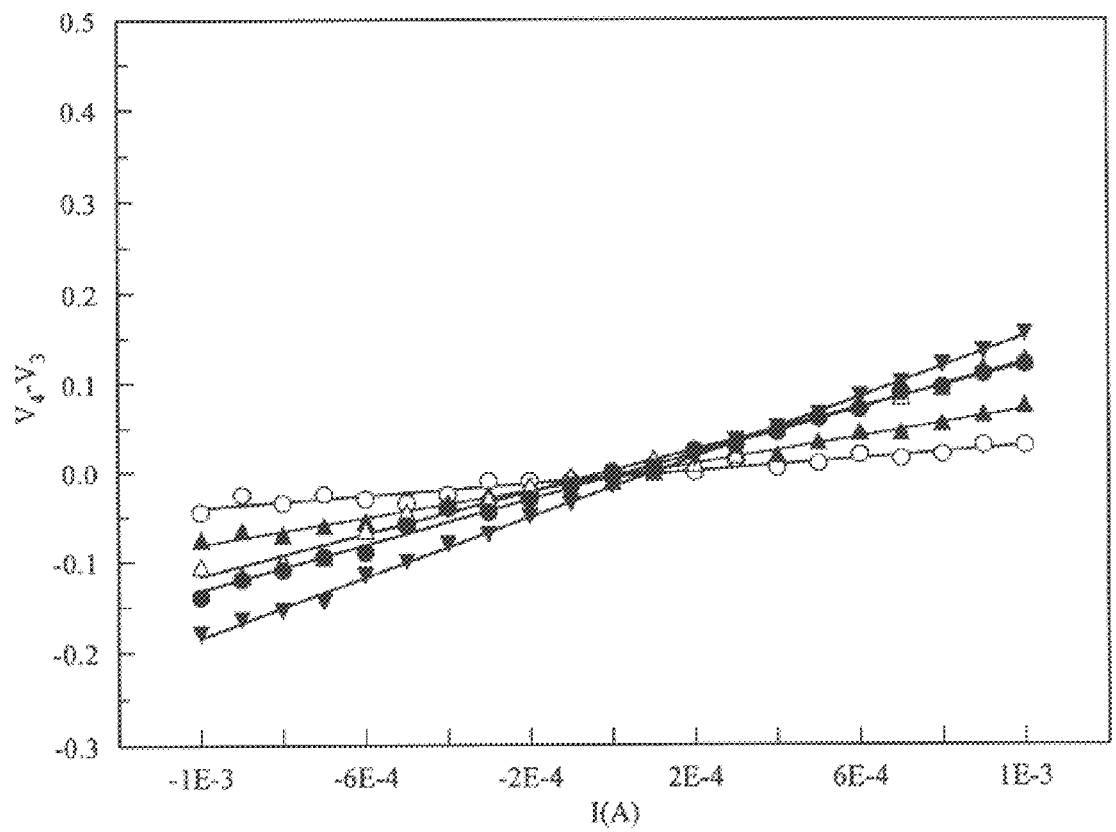
FIG. 8A is a graph showing ultra-grain I–V at different strains.
Figure 8B:
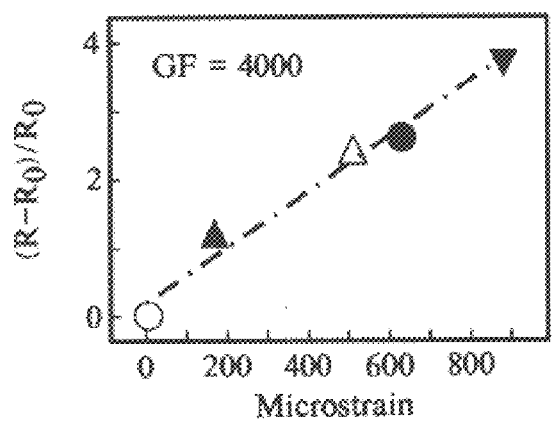
FIG. 8B is a graph showing the gauge factor (GF).
Figure 8C:
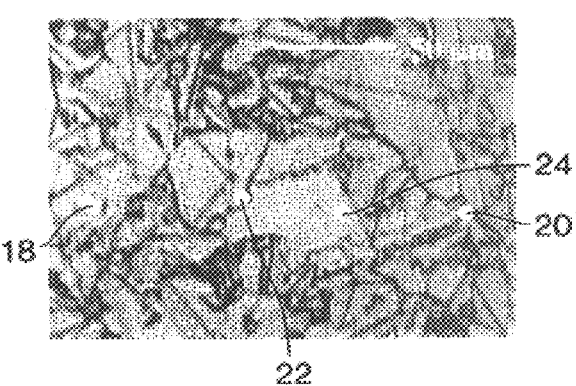
FIG. 8C is a photograph showing probes 18, 20, 22 and 24.
Figure 9A:
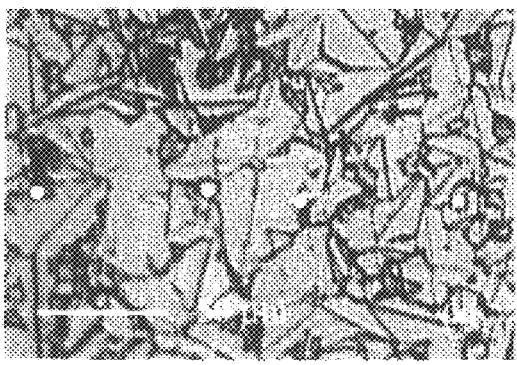
FIGS. 9A and 9C are photographs showing inter-grain probe locations.
Figure 9B:
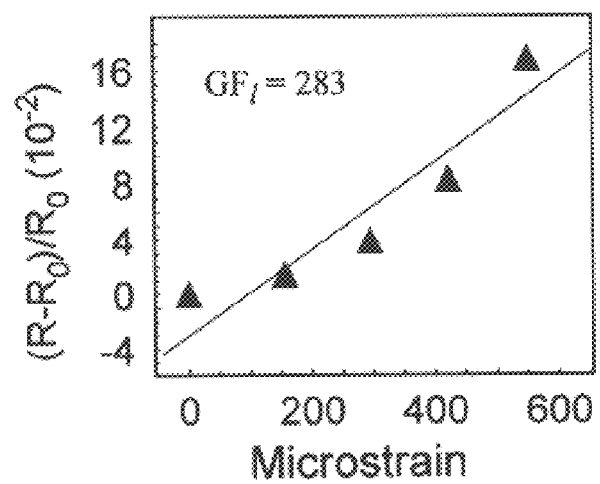
FIGS. 9B and 9D are graphs showing gauge factors (GF) for FIGS. 9A and 9C.
Figure 9C:
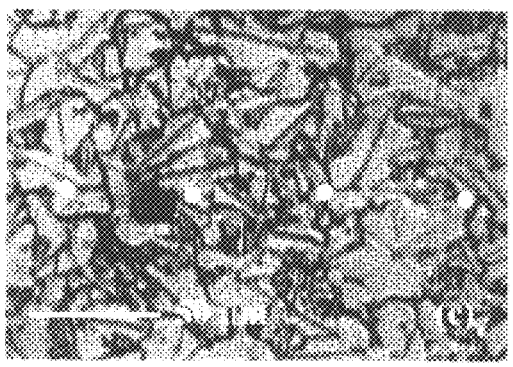
Figure 9D:
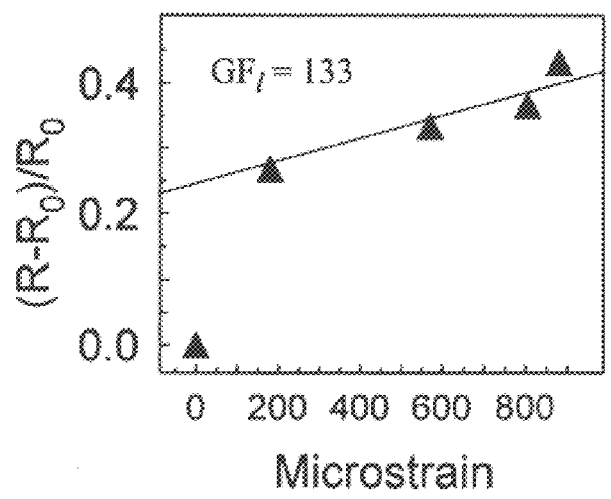

FIG. 8A shows the I–V data measured at different strains with the voltage probes placed such that the shortest path does not cross an inter-grain groove, as indicated by the white dots in FIG. 8C. The extracted $(R-R_0)/R_0$ vs. strain curve shown in FIG. 8B is linear and reveals an intra-grain $GF_1$ over 4000. To investigate the effect of grain-boundary (GB) on $GF_1$, the voltage probes are placed so that their shortest path crosses a single GB, as shown in FIG. 9A. The resulting piezoresistive response depicted in FIG. 9B reveals that linearity deteriorates and $GF_1$ decreases to 283. Further deterioration is observed when the shortest path between voltage probes crosses approximately eight GBs in a region dominated by relatively small grains, as seen in FIG. 9C. The corresponding $(R-R_0)/R_0$ vs. strain curve, as shown in FIG. 9D is scattered especially at low strains. A best linear fit at high strains yields a $GF_1$ of 133.

The intra-grain GF values are consistent with those reported for single crystal p-type diamond, the inter-grain GF values are within the range reported for polycrystalline diamond films (Vaseashta, A. K. et al., Diamond—a novel sensing material, J. of Intelligent Material Systems and Structures 4 (1993) 129–135; Taher, I. et al., Piezoresistive microsensors using p-type CVD diamond films, Sensors and Actuators A 45 (1994) 35–43; Aslam, M. et al., Piezoresistivity in vapor-deposited diamond films, Appl. Phys. Lett. 60 (23) (1992) 2923–2925; Dorsch, O. et al., Piezoresistive effect in boron-doped diamond thin films, Diamond 92 (ICNDST-3), Heidelberg, Germany, September 1992, pp. 20.2–20.3; Wur, D. R. et al., Fabrication and characterization of doped polycrystalline diamond film (PDF) for strain sensing applications, in Proc. 7th Int. Conf. Solid State Sensors and Actuators (Transducers '93), Okohama, Japan, Jun. 7–10, 1993, pp. 722–725; Deguchi, M. et al., Piezoresistive property of CVD diamond films, presented at Diamond '96 (Diamond Films) jointly with ICNDST-5, Tours, France, September 8–13, Abstract No. 16.2, 1996 and Davidson, J. L. et al., Microelectronic pressure sensors with diamond piezoresistors on diamond diaphragm, Advances in New Diamond Science and Technology, 1994, pp. 693–700). As the zero-strain resistivities for the probe configurations shown in FIGS. 8C and 9A and 9C are 0.03, 0.27 and 0.10 Ωcm, respectively, the large difference in GFs cannot be attributed to resistivity. It is worth mentioning that the average film resistivity, measured with inter-probe separation equal to 20 times the mean grain size, is on the order of 0.28 Ωcm.

Equation 7 is:

$$GF \approx \left(\frac{1}{1+\alpha}\right)GF_g$$

If $GF_g$=4000, Eq. (7) yields α values of 13 and 29 for GF=283 and 133 for the probe configurations of FIG. 10, respectively. This result suggests that GBs have higher resistance than grains and that GB contribution to path resistance increases with the number of GBs crossed. It is worth mentioning that the computed α values would be higher if $GF_b \neq 0$.

The larger GB resistance is consistent with the series resistance model used in Eq. 1, which assumes that current flow in the film is dominated by carrier transport from one grain to the other across GB. The high GB resistance could be due to GB potential barriers, as suspected from intergrain I-V (Sahli, S. et al., Non-uniform conduction in B-doped chemical vapor deposited diamond studied by intra- and inter-grain measurements, Appl. Phys. Lett. 70 (16) (1997) 2129–2131) and/or Boron desegregation at GB (Huang, J. T. et al., Desegregation of boron at the grain boundaries of the in-situ boron doped diamond films, Appl. Phys. Lett 67 (16) (1995) 2382).

It is important to emphasize that the derived ratio of GB to grain resistance is subject to the assumption that strain distribution along the current path is uniform. Homogeneous internal strain distributions were reported for polycrystalline diamond (Feldman, A. et al., Workshop on Characterizing Diamond Films III (NISTIR 5418), Gaithersburg, Md., USA, 23–24 February 1994, pp. 8–11), direct measurement of the strain along the current path shown in FIGS. 9A and 10 is needed to fully confirm the α values.

Figure 10:
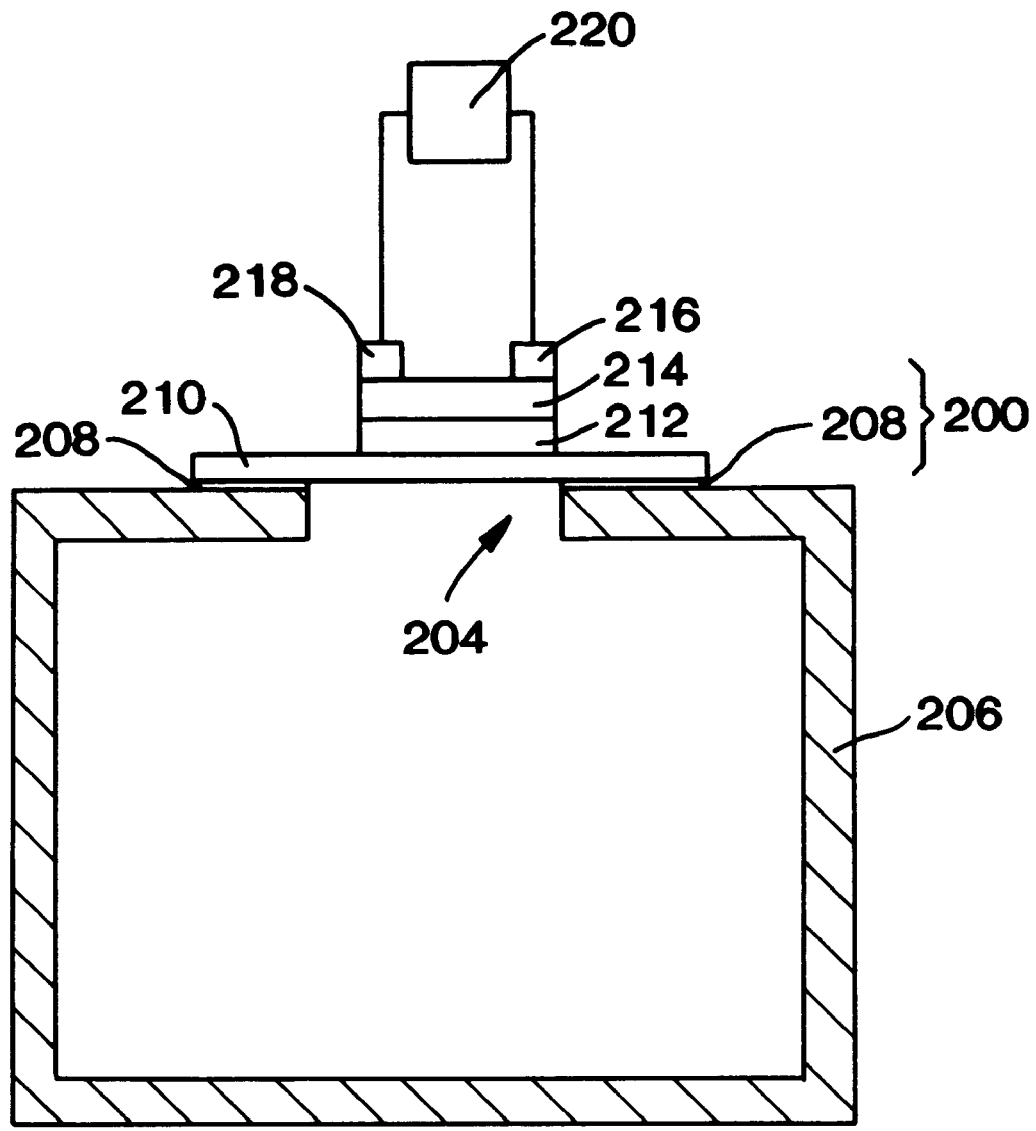
FIG. 10 is a schematic view of a vacuum chamber 206 with the sensor 200 mounted over an opening 204.

FIG. 10 is a schematic view of a sensor 200 including a base 210 covering an opening 204 of a low pressure chamber 206. The base 210 of the sensor 200 is mounted over the opening 204 and secured in position by a seal 208. An undoped diamond crystal 212 is mounted on the base 210. A doped diamond thin film 214 is mounted on the undoped diamond crystal. Metal contacts 216 and 218 are mounted on the film 214 by selective vapor deposition or the like. The metal contacts 216 and 218 mount electrical leads to an ohmmeter 220 or other suitable measuring instrument. Alternatively, there can be two sets of leads, one set for I and the other set for V as shown in FIGS. 4C, 5C and 6C. The device can be used as a vacuum gauge or it can be used in an intake manifold of an automobile to measure pressures and thus, meter air/gasoline mixtures correctly into the manifold.

The diamond sensors of the present invention with the large gauge factor (GF) are used to measure pressure, vibration and other forms of strain for use in temperature (thermistor), automobile and aerospace systems and engines (e.g. weight means in a small air bag system). The diamond sensors outperform Si and SiC based sensors in sensitivity, in the ability to operate in harsh environments and at high temperatures. The sensor can be used as a thermistor to measure air flow in an inlet of air to an engine in a vehicle.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. An electronic device which comprises:
   (a) a non-conductive diamond first single crystal (DSC) having a face in a polycrystalline diamond;
   (b) an adherent layer of chemical vapor deposited (CVD) diamond deposited on the face as a second single crystal containing a dopant amount of at least one element which renders the second single crystal of the CVD diamond layer semi-conductive on the DSC, wherein contact means for at least two electrodes are provided on the second single crystal of the CVD diamond layer so as to provide conduction through the CVD layer adjacent to spaced apart portions adjacent to the face of the DSC and wherein electrical resistance of the single crystal CVD diamond layer on the DSC varies as a function of different forces causing strain applied to the layer; and
   (c) a surface to which the strain is to be applied which mounts the DSC.

2. The measuring device of claim 1 wherein the DSC is a polished crystal in polycrystalline diamond deposited by a chemical vapor deposition (CVD) method.

3. The device of claim 1 wherein at least two of the electrodes are mounted on the second crystal of the CVD layer adjacent to the spaced apart portions of the face of the DSC.

4. The device of any one of claims 1, 2 or 3 wherein the electrodes are mounted on the CVD diamond layer by means of selective vapor deposition of a metal on the second single crystal CVD diamond layer.

5. The device of any one of claims 1, 2 or 3 wherein the DSC is a polished crystal in a layer of polycrystalline diamond deposited by a chemical vapor deposition method and wherein the face of the DSC is between 1 micron and 1 millimeter in diameter.

6. The device of any one of claims 1, 2 or 3 wherein the electrodes are provided on the CVD diamond layer by means of a metal deposited on the CVD diamond layer and then the deposition of a photo-resist to pattern the metal for removal to form the electrodes.

7. A method for forming an electronic device, which comprises:
   (a) providing at least one non-conductive diamond first single crystal (DSC) having a face in a polycrystalline diamond;
   (b) depositing an adherent layer of chemical vapor deposited (CVD) diamond on the face as a second single crystal containing a dopant amount of at least one element which renders the second single crystal of the CVD diamond semi-conductive on spaced apart portions of the face of the DSC, wherein contact means for at least two electrodes are provided on the CVD diamond layer adjacent to spaced apart portions adjacent the DSC and wherein the electrical resistance of the single crystal CVD diamond layer on the DSC varies as a function of different forces causing strain applied to the layer; and (c) mounting the DSC on a surface to which a strain is to be applied.

8. The method of claim 7 wherein electrical probes are provided on the second crystal of the CVD diamond layer adjacent to the face of the DSC to conduct current through the CVD diamond layer.

9. The method of claim 7 wherein at least two of the electrodes are mounted on the CVD diamond layer on the spaced apart portions adjacent to the face of the DSC.

10. The method of claim 7 wherein the electrodes are provided on the CVD diamond layer by means of selective vapor deposition of a metal on the CVD diamond layer.

11. The method of any one of claims 7, 8 or 9 wherein the DSC is a polished single crystal in a layer of polycrystalline diamond deposited by a chemical vapor deposition method and wherein the DSC is between about 1 micron to 1 millimeter in diameter.

12. The method of any one of claims 7, 8 or 9 wherein the electrodes are mounted on the CVD diamond layer by means of a metal deposited on the CVD diamond layer and then the deposition of a photo-resist to pattern the metal for removal to form the electrodes.

13. A method for changing electrical resistance as a function of strain, which comprises:

(a) providing a non-conductive diamond first single crystal (DSC) having a face in a polycrystalline diamond; and an adherent layer of chemical vapor deposited (CVD) diamond deposited on the face as a second single crystal containing a dopant amount of at least one element which renders the second single crystal of the CVD diamond layer semi-conductive on the DSC, wherein contact means for at least two electrodes are provided on the second single crystal of the CVD diamond layer so as to provide conduction through the CVD layer adjacent to spaced apart portions adjacent to the face of the DSC and wherein electrical resistance of the single crystal CVD diamond layer on the DSC varies as a function of different forces causing strain applied to the layer and wherein the DSC is mounted on the surface to which the strain is to be applied;

(b) applying a strain to the single crystal of the CVD diamond layer of the electrical device on the surface and detecting a difference in the electrical resistance.

14. The method of claim 13 wherein the DSC is a polished crystal in polycrystalline diamond deposited by a chemical vapor deposition (CVD) method.

15. The method of claim 13 wherein at least two of the electrodes are mounted on the second crystal of the CVD diamond layer adjacent to the spaced apart portions of the DSC.

16. The method of any one of claims 13, 14 or 15 wherein the electrodes are mounted on the CVD diamond layer by means of selective vapor deposition of a metal on the second crystal of the CVD diamond layer.

17. The method of any one of claims 13, 14, 15 or 16 wherein the DSC is a polished crystal in a layer of polycrystalline diamond deposited by a chemical vapor deposition method and wherein the DSC is between 1 micron and 1 millimeter in diameter.

18. The method of claim 9 wherein the electrodes are provided on the CVD diamond layer by means of a metal deposited on the CVD diamond layer and then the deposition of a photo-resist to pattern the metal for removal to form the electrodes.

* * * * *